United States Patent [19]

Slavens

[11] Patent Number: 4,857,701
[45] Date of Patent: * Aug. 15, 1989

[54] INTERNAL WELDING HEAD ASSEMBLY

[75] Inventor: Clyde M. Slavens, Houston, Tex.

[73] Assignee: CRC-Evans Pipeline International, Inc., Houston, Tex.

[ * ] Notice: The portion of the term of this patent subsequent to Apr. 15, 2004 has been disclaimed.

[21] Appl. No.: 610,317

[22] Filed: May 14, 1984

[51] Int. Cl.$^4$ ............................. B23K 9/00; B23K 9/12
[52] U.S. Cl. ............................. 219/125.12; 219/60 A
[58] Field of Search ............... 219/60 R, 60 A, 61, 219/61.4, 66, 125.12

[56] References Cited

U.S. PATENT DOCUMENTS 3,632,959  6/1972  Nelson et al. .............. 219/124.33 X
3,903,391  9/1975  Nelson et al. .............. 219/125.12
4,306,134  12/1981  Slavens et al. .............. 219/125.12

Primary Examiner—Clarence L. Albritton
Assistant Examiner—Catherine M. Sigda
Attorney, Agent, or Firm—Carl B. Fox, Jr.

[57] ABSTRACT

Internal welding head apparatus, wherein a welding torch is mounted on a pivotal support for movement of the torch toward and away from the weld site, and wherein the torch is carried on a rotative shaft to be oscillated transversely by oscillation of the rotative shaft, oscillation of the rotative shaft being accomplished by rotation of an eccentric in a yoke fixed to the rotative shaft, and wherein the oscillations are dampened by spring means disposed at opposite sides of the rotative shaft. The apparatus is compact, and is adapted to be mounted on a carrier to be rotated about the interior of a pipe or tank, or the like.

16 Claims, 5 Drawing Sheets

Fig_2

INTERNAL WELDING HEAD ASSEMBLY

BACKGROUND OF THE INVENTION

Internal welding head assembly adapted for welding at the interior of a structure, such as a pipe, tank, or the like, and adapted to be mounted upon a support which will move the welding head assembly along the weld track. The welding head assembly includes means for moving the welding tip with respect to the welding track so that the distance of the tip from the welding track may be adjusted, and includes welding tip oscillator means, welding current supply means, shielding gas supply means, operating gas supply means and means for guiding the welding tip along the weld track. A side plate mounts on the support for the welding head assembly. The welding head is pivotally connected to the support plate so that it may be moved with relation to the weld track. Means for oscillating the welding tip transversely of the weld track is provided in the assembly. The components of the welding head assembly are mounted compactly in a self contained package which may be readily transported, installed, removed, and replaced at the point of use. Since the assembly is small, it may be fitted within a small space, and plural welding head assemblies may be installed in the space previously occupied by a single welding head assembly. The apparatus provided according to this invention fulfills a need in the art, in providing such a welding head assembly which is compact, reliable, and simple in operation.

SUMMARY OF THE INVENTION

The internal welding head assemblies provided by the invention include a pivotal welding head having means for adjusting the tilt of the welding head to adjust its distance from the weld track, and includes cam means for oscillating the welding head transversely of the welding track, and includes supply means for providing electrical welding current, gases, and the like, for the welding operation. The components of the assembly are mounted compactly against the side plate which serves as a support therefor, and which may be mounted against a carrier for the assembly. Each component is compact and simple in operation, so that maintenance and operation are simplified. The apparatus is light in weight and dependable in operation so that extensive training is not required for its operation.

A principal object of the invention is to provide an internal welding head assembly which is compact and light in weight. Another object of the invention is to provide such an internal welding head assembly which provides for welding tip position adjustment and welding head tip oscillation. A further object of the invention is to provide such an internal welding head assembly which may be easily serviced and adjusted. Yet another object of the invention is to provide such an apparatus which is economical and which is adapted for a diversity of welding operations.

Other objects and advantages of the invention will appear from the following detailed description of a preferred embodiment, reference being made to the accompanying drawings.

DESCRIPTION OF THE PREFERRED EMBODIMENT

Figure 1:
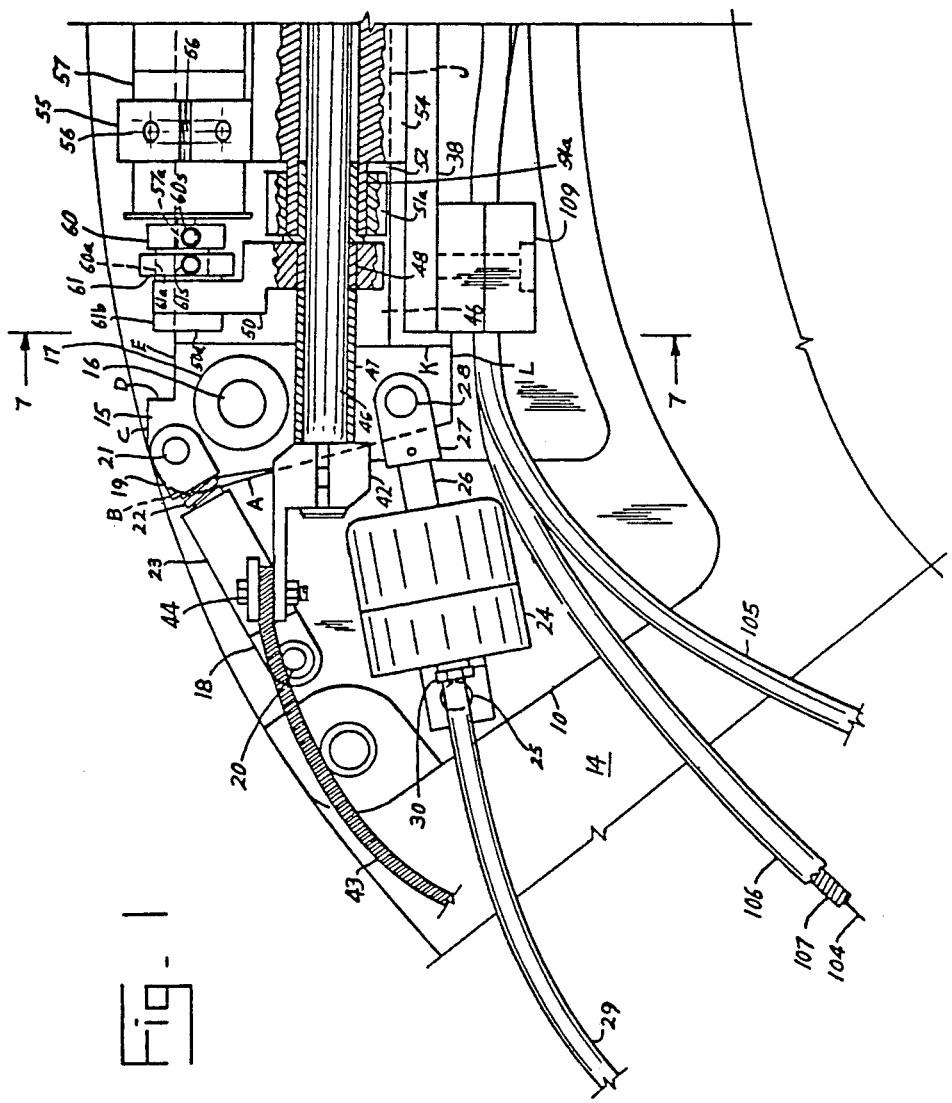
FIG. 1 is a side elevation of a preferred form of apparatus according to the invention, showing the lefthand portion of the apparatus.

Referring now to the drawings in detail, and first to FIGS. 1–4, a side support plate 10, carrying the apparatus assembly components, is adapted to be mounted on a suitable usually movable support, such as disc or plate 65 of U.S. application for patent Ser. No. 567,738, filed Jan. 3, 1984, U.S. Pat. No. 4,525,616. The plate 10 is shown affixed to a circular support disc or plate 14 forming part of an internal clamp and welding apparatus. The disc 14 is disposed between a pair of clamps as illustrated in said U. S. application patent Ser. No. 567,738, filed Jan. 3, 1984. U.S. Pat. No. 4,525,616.

A torch base plate 15 is pivotally connected to plate 10 by a pin 16 and hub 17, pin 16 being fixed to plate 10 and hub 17 being fixed to plate 15. Base plate 15 rotates with hub 17 about pin 16. Spring end pivots 18, 19 are pivotally mounted on pins 20, 21, respectively, which are fixed to plates 10, 15. A helical compression spring 22 disposed within a spring sleeve 23 biases the part of plate 15 above pin 16 toward the right, as shown in FIG. 1. A cylinder 24, pivotally connected to plate 10 at pin 25, has its shaft 26 connected by fitting 27 to pin 28 depending from plate 15. When cylinder 24 is operated by introduction of pressured air or gas at the lefthand side of its piston (not shown), the lower part of plate 15 is moved toward the right, compressing spring 22. Gas for operation of cylinder 24 is supplied through a flexible conduit 29 connected to cylinder 24 at fitting 30. When plate 15 is rotated as described, the welding head apparatus to the right of plate 15 is rotated, moving welding tip 31 closer to the pipe 32 at an end of which the weld bead 33 is formed. The end of pipe 32 has annular outer and inner beveled portions 34, 35 between which there is a nonbeveled portion 36. Another pipe end (not shown) is disposed against the end of pipe 32.

Figure 3:
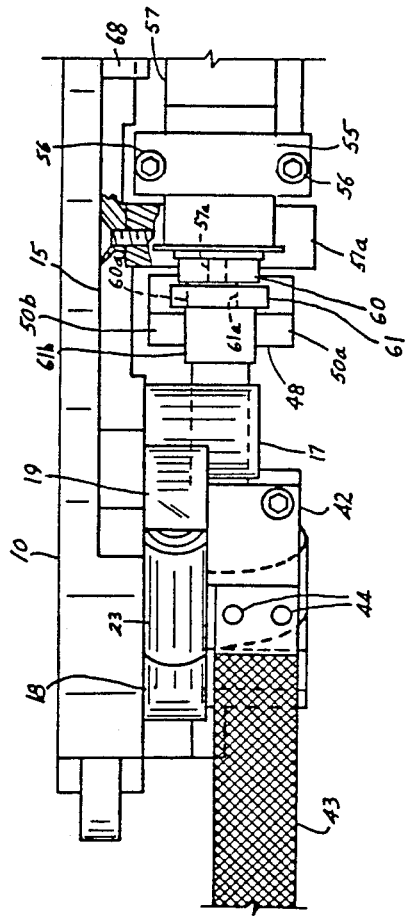
FIG. 3 is a top elevation of the apparatus portion shown in FIG. 1.
Figure 4:
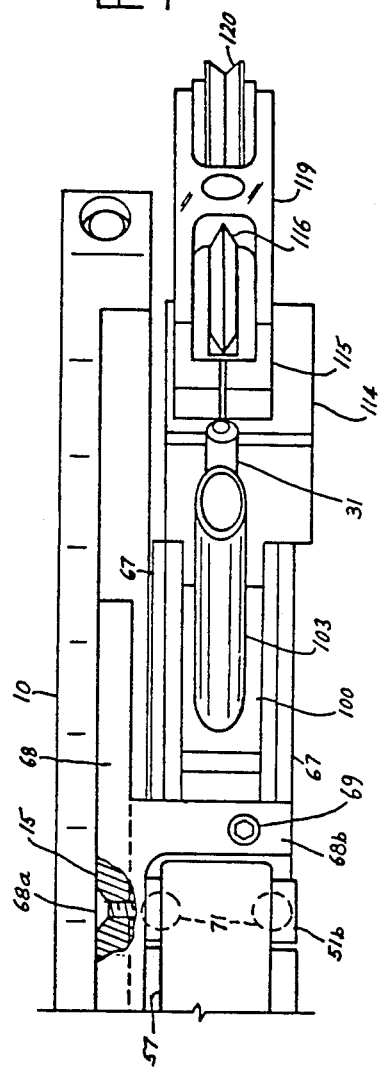
FIG. 4 is a top elevation of the apparatus portion shown in FIG. 2.
Figure 5:
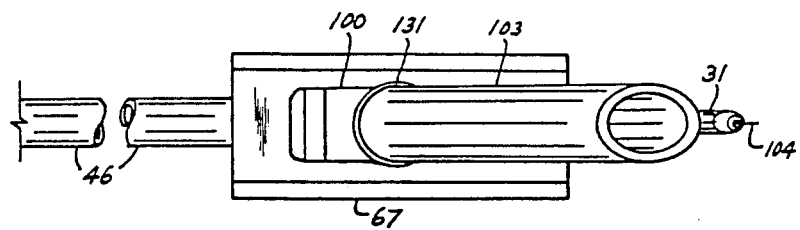
FIG. 5 is an upper elevation showing the welding tip portion of the apparatus.
Figure 6:
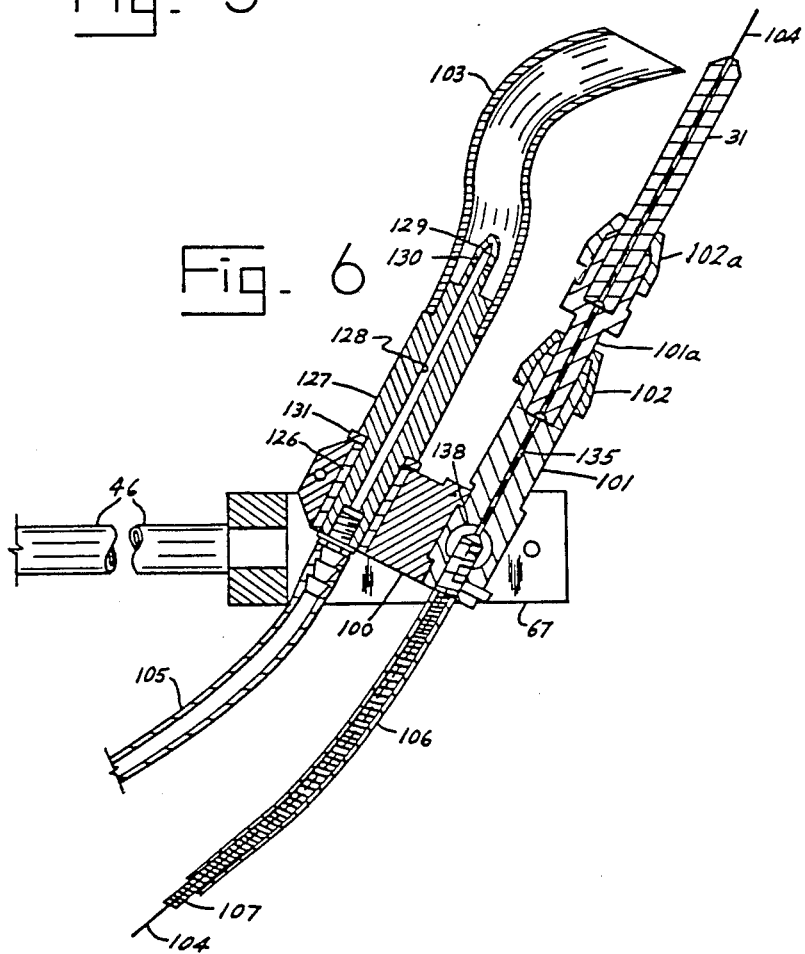
FIG. 6 is a side elevation of the apparatus shown in FIG. 5.

A torch adjustment plate 38 is fixed to torch pivot mount 54 by screws 38a. A power lug clamp 42 is fixed to shaft 46 disposed through insulating sleeves 47, 48, 49, and an electrical power cable 43 is fixed to clamp 42 at a pair of clamp screws 44. Shaft 46 is an electrical conductor shaft, disposed through the insulator sleeves 47–49. Shaft 46 is connected, around sleeve 48, to a yoke member 50. The opposite arms of the yoke, 50a, 50b, are shown in FIG. 3. A pair of torch mount blocks 51a, 51b are rotatable about reduced ends 54a, 54b of torch pivot mount 54.

Base plate 15, mentioned earlier, has the outline shown by lines A-L, FIGS. 1 and 2. Torch mount blocks 51a, 51b are connected to plate 15 by suitable screws.

Torch pivot mount 54 supports a clamp assembly 55 connected by opposite screws 56 about an electric servo motor 57. Disc 60 is fixed concentrically on the shaft 57a of servo motor 57. Disc 60 has an extending eccentric cylindrical shaft 60a which is fitted through an eccentric cylindrical opening 61a through cam disc 61.

Figure 7:
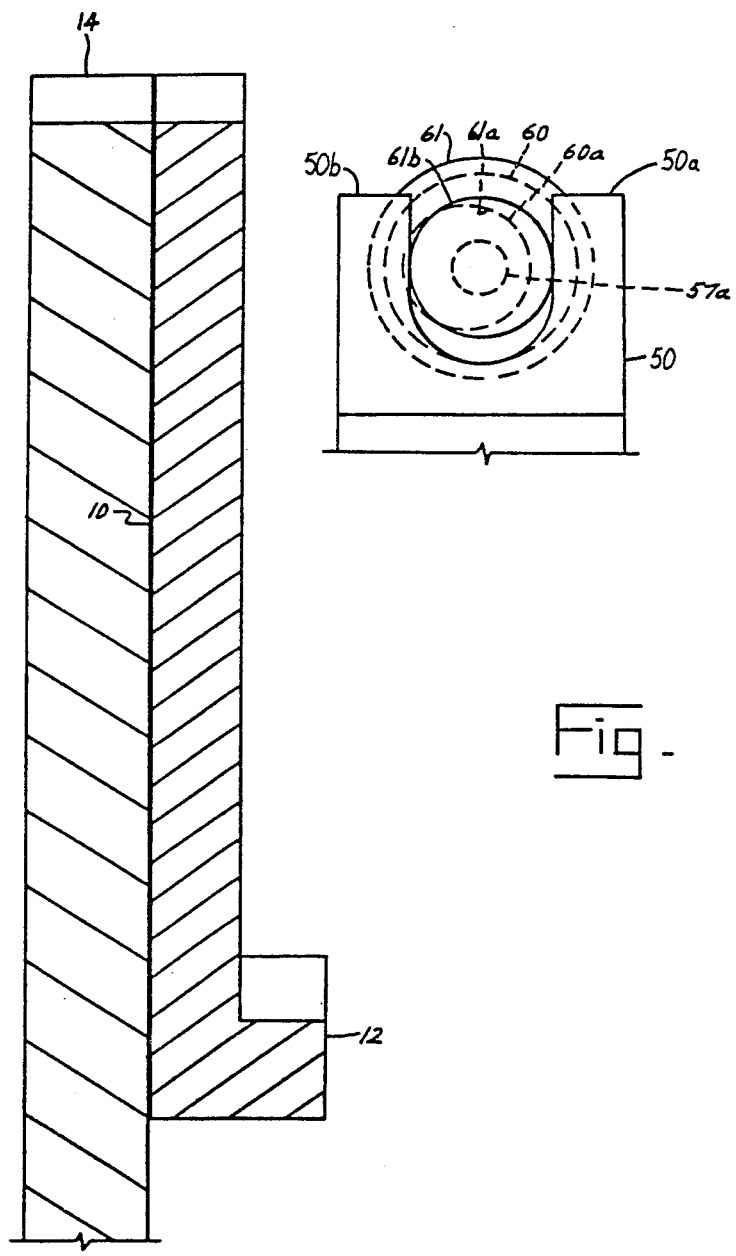
FIG. 7 is a partial vertical cross section taken at line 7—7 of FIG. 1.

Referring now also to FIG. 7 of the drawings, the eccentricity of cylindrical shaft portion 60a is equal to the eccentricity of the cylindrical opening 61a of disc cam 61 with respect to the circular outer periphery of disc cam 61 and with respect to the axis of motor shaft 57a. Therefore, by rotation of disc cam 61 with respect to disc 60 the total eccentricity of the cylindrical outer periphery of disc cam 61 may be adjusted from zero to twice the eccentricity of shaft portion 60a and opening 61a. When disc cam 61 is rotated between arms 50a, 50b of yoke 50, between which it is closely fitted at its concentric reduced cylindrical extension 61b, yoke 50 is oscillated transversely.

In FIG. 7, there is shown the disc 14 and side support plate 10. The inner edge form of plate 10 at flange 12 is shown in FIG. 7.

Set screws 60s, 61s fix disc 60 and disc cam 61, respectively, to servo motor shaft 57a and shaft portion 60a.

When yoke 50 is pivotally oscillated about shaft 46, which is rotated therewith, by rotation of motor shaft 57a and eccentric 61b, the oscillation is transmitted by shaft 46 to torch mount block 67. Therefore, upon rotation of motor 57 with the part 61b in an eccentric position, the torch mount 67 and the welding tip 31 carried thereby are oscillated transversely of the weld bead 33.

A mount block 68 is supported on base plate 15 by plural screws 68a, and has a transversely extending part 68b. A screw 69 is screwed through part 68b, and its length of extension beneath the part 68b can be adjusted by rotation. Upon oscillatory rotation of shaft 46, the plate 38, screwed to pivot mount 54 by screws 38a, is rotated and is cushioned at the end of rotation in each direction by a compression spring 71 acting against the bottom of mount block 51b, there being a spring 71 at each side of mount block 51b. The springs 71 on each side of mount 51b create a null point for the tracking motions along the welding groove and lend flexibility to plate 38.

Torch mount block 67 carries, through an opening therethrough, a gas tube mount block 100 supporting a gas tube fitting 127 and a welding tip tube 101. The tip 31 is affixed to tube 101 at screw fittings 102, 102a, there being an extension 101a therebetween. Fitting 127 carries a curved gas tube 103 which is adjusted to be directed at its outer end toward the welding wire 104 which passes through tip 31. Tubular conduit 105 leading from a suitable shielding gas supply conveys shielding gas to the weld site in order to decrease weld oxidation. Conduit 106 sheaths a welding wire guide 107 through which the welding wire passes from a suitable wire feeder at another location. An insulator sleeve, not shown, is preferably provided about guide 107. The tubes 105, 106 are secured by a clamp block 109 secured beneath one end of plate 38, as shown.

Helical compression spring 112 disposed about a core shaft or bar 113 is compressively disposed between a fitting 114 screwed to plate 38 at 114x, and a block 115 held in aligned position by shaft 113. A pin 114a fixes core shaft 113 in place in a slidable disposition, pin 114a sliding in a slot 114b in fitting 114, as shown. Pin 114a also prevents rotation of shaft 113.

A roller 116 is mounted in a slot opening in one end of fitting 119, on axle pin 117 disposed through opposite bars 118 and fitting 119. Fitting 119 is pivotal about pin 117. At the end of fitting 119, a second roller 120 is rotatively disposed, in a slot opening through fitting 119, about axle pin 121. A tension adjustable helical compression spring 122 is disposed between block 115 and the fitting 119. Spring 122, of course, biases fitting 119 and roller 120 toward the internal welding groove at 35. Spring 112 biases rollers 116, 120 toward the welding groove.

Figure 2:
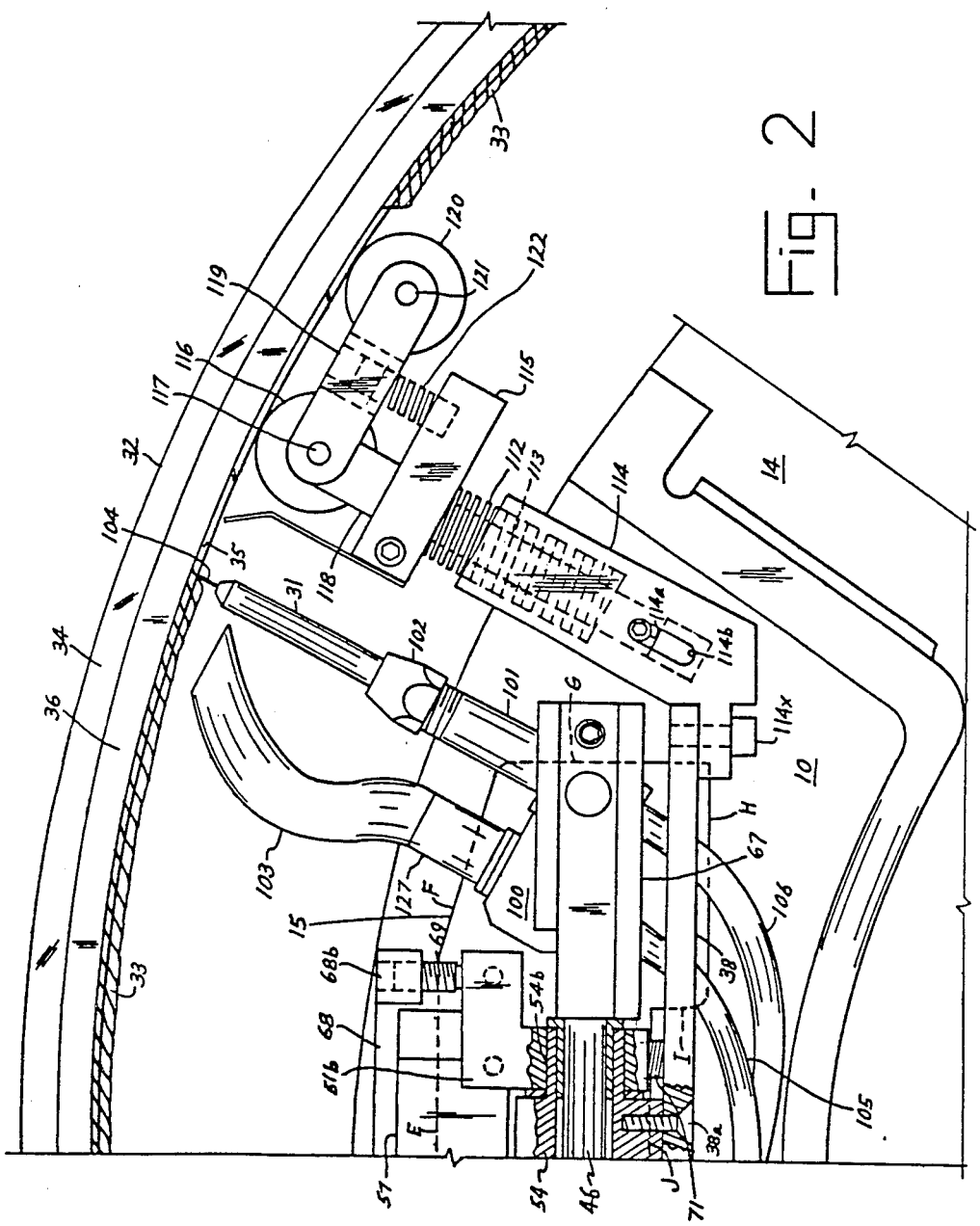
FIG. 2 is a side elevation of the apparatus of FIG. 1, showing the righthand portion of the apparatus.

Mount 67 carries the fitting 100 having an opening through which insulator sleeve 126 and thickwall tube 127 are received. Tube 127 has a small passageway 128 to pass gas from tube 105 to the curved tube 103. Tube 127 has a diffuser formation 129 at its end, so that the gas passed through tube 127 is broken into plural lateral streams at openings 130. An insulation washer 131 is disposed against the shoulder of tube 127 at its entrance into fitting 100. The sleeve 126 and washer 131 prevent electrical welding current from being passed to tube 127 and tube 103. When it is desired for tube 103 to be closer to the support elements, as when the welding assembly is within a smaller diameter pipe or tank, or the like, then a shorter tube 127 may be employed, as shown in FIG. 2.

Welding tip holder 101 is attached to fitting 100 and has a narrow passage 135 through which the welding wire passes. Passage 135 has a recess into which adapter 101a is received and the welding tip 31 is similarly received into a recess in the end of adapter 101a. Screwed fittings 102, 102a connect adapter 101a to tube 101 and connect tip 31 to adapter 101a, as shown. When the tip is to be in a retracted position corresponding to the previously mentioned inwardly moved position of tube 103, the adapter 101a may be omitted and the welding tip disposed directly into the recess in the end of tube 101. Fitting 100 may be rotated about a mounting pin 138 which connects it to block 67, so that the welding tip and tube 103 angle may be adjusted with respect to the welding groove.

The described internal welding head apparatus provides a substantial improvement over the prior art. The apparatus is compact, yet provides adjustment of tip to weld distance by adjustment of the pivot angle about hub 17 at pin 16, and provides adjustable tip oscillation across the weld at yoke 50, and provides tip angle adjustment about pin 138, and provides reliable welding wire feed through conduit 106 and wire guide 107, and provides shielding gas feed through conduit 105 and operating gas feed through conduit 29. The entire assembly is simple and easy to maintain and is designed for long operating life.

While a preferred embodiment of the apparatus according to the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Internal welding head apparatus, comprising a pivotal welding head support, means spring biasing said support in one pivotal direction about a pivot, fluid cylinder means for moving said support in the other pivotal direction about said pivot, means adjustably limiting said pivotal movement of said support in at least one direction of pivotal movement thereof about said pivot, said support carrying a pivot block through which a pivot shaft rotatably extends, a welding torch mounted on said pivot shaft to be rotatable therewith, a yoke fixed at its base to said pivot shaft and having a pair of yoke arms extending outwardly therefrom, a rotatable eccentric disposed between said yoke arms whereby when said eccentric is rotated said yoke is oscillated dependent on the eccentricity of said eccentric whereby said welding torch is oscillated when said eccentric is rotated to spread a weld bead formed by said torch transversely of a weld path.

2. The combination of claim 1, said eccentric comprising an electric motor having a rotatable shaft, a first disc carried concentrically on said shaft of said motor, a cylindrical shaft formation extending eccentrically from one face of said first disc, a second disc having an eccentric circular opening fitted about said cylindrical shaft formation of said first disc, a concentric extending portion of said second disc being fitted between said yoke arms.

3. The combination of claim 2, the eccentricity of said cylindrical shaft formation of said first disc and of said circular opening of said second disc being equal, mutual rotations of said discs adjusting the eccentricity of said concentric extending portion of said second disc from zero to twice said equal eccentricity to adjust the magnitude of oscillation of said welding torch.

4. The combination of claim 3, further comprising a body fixed to said pivot shaft, a plate fitted to said welding head support adjacent said body, compression spring means between said body and said plate at opposite sides of said pivot shaft to dampen said oscillations of said welding torch and provide a null point thereof, and to spring cushion said welding torch.

5. The combination of claim 4, including a shielding gas delivery tube, said shielding gas delivery tube and said welding torch being carried on a common support fixed on said pivot shaft, whereby said shielding gas delivery tube and said welding torch are oscillated together.

6. The combination of claim 5, said common support being pivotally adjustable with respect to said pivot shaft to adjust the angle of said delivery tube and said welding torch with respect to the length of a welding path.

7. The combination of claim 6, said pivot comprising a pivot pin extending perpendicularly from a support plate and said welding head support including a hub pivotably movably disposed about said pin.

8. The combination of claim 7, said shielding gas delivery tube and said welding torch each being of adjustable length whereby said apparatus is adaptable for use in pipes of at least two different diameters.

9. The combination of claim 8, said electric motor being a servo motor.

10. The combination of claim 9, said pivot shaft comprising a conductor for conveying welding current to said welding torch.

11. Internal welding head apparatus for welding an internal weld bead between the ends of two pipes disposed end to end, comprising a support plate adapted for attachment to a support for carrying the apparatus around the interior of a pipe, a second support pivotally connected parallel to said support plate, a support block supported by said second support and having a rotative shaft supported therethrough, welding torch means pivotally connected to one end of said rotative shaft for movement in a plane through said rotatable shaft, means for oscillating said rotative shaft in rotative motion about its axis whereby said welding torch means is oscillated therewith, means for pivotally moving said second support to move said welding torch toward and away from a welding path around the ends of said pipes.

12. The combination of claim 11, said means for oscillating said rotative shaft comprising an eccentric shaft rotating within a yoke carried by said rotative shaft.

13. The combination of claim 12, said eccentric shaft being formed on the face of a circular disc having an eccentric circular opening therethrough, a second circular disc fixed concentrically on the shaft of an electric motor and having an eccentric cylindrical projection fitted into said eccentric circular opening of said first named disc.

14. The combination of claim 13, the eccentricity of said circular opening and the eccentricity of said cylindrical projection being equal, mutual rotations of said discs adjusting the eccentricity of said eccentric shaft from zero to twice said equal eccentricity to adjust the magnitude of oscillation of said welding torch.

15. The combination of claim 14, including block means fixed to said rotative shaft, base means fixed to said second support, compression springs disposed between said block means and said base means at opposite sides of said rotative shaft, whereby each oscillatory movement of said rotative shaft is dampened and whereby said springs create a null point with respect to said oscillations.

16. The combination of claim 15, including conduit means for conveying shielding gas to a delivery tube associated with said welding torch, conduit means for conveying welding wire to said torch from a wire feeder, a fluid cylinder for pivoting said second support, conduit means for supplying operating fluid to said fluid cylinder, and conductor means for supplying electric welding current to said rotative shaft for delivery to said welding torch.

* * * * *